(12) United States Patent
Sharpe

(10) Patent No.: US 7,441,516 B2
(45) Date of Patent: Oct. 28, 2008

(54) ANIMAL FACE WRAP AND METHOD OF USING

(76) Inventor: Susan D. Sharpe, 11652 N. 825 W., Huntington, IN (US) 46750

( * ) Notice: Subject to any disclaimer, the term of this patent is extended or adjusted under 35 U.S.C. 154(b) by 0 days.

(21) Appl. No.: 10/917,034

(22) Filed: Aug. 12, 2004

(65) Prior Publication Data

US 2005/0013851 A1  Jan. 20, 2005

Related U.S. Application Data

(63) Continuation-in-part of application No. 09/797,011, filed on Mar. 1, 2001, now Pat. No. 6,820,574.

(51) Int. Cl.
  *A01K 27/00* (2006.01)
  *A01K 15/00* (2006.01)
(52) U.S. Cl. ........................ 119/856; 119/792; 119/811; 119/814; 119/820; 119/850
(58) Field of Classification Search ............. 2/235–237, 2/161.1, 209.11, 181; 119/761, 762, 766, 119/800, 809–814, 820–824, 830, 831, 741, 119/837, 832, 792, 725, 856, 816–818, 793, 119/863; 602/902, 26, 20; 54/28, 58
See application file for complete search history.

(56) References Cited

U.S. PATENT DOCUMENTS

| | | | |
|---|---|---|---|
| 301,211 A | 7/1884 | Canan | |
| 544,590 A | 8/1895 | Ransom | |
| 663,108 A * | 12/1900 | Todd | 119/831 |
| 977,547 A * | 12/1910 | Read | 119/819 |
| 1,474,231 A * | 11/1923 | Brown | 119/831 |
| 1,800,421 A * | 4/1931 | Wickersham et al. | 119/863 |
| 2,187,021 A * | 1/1940 | Everson | 119/792 |
| 2,464,867 A * | 3/1949 | Johnson | 119/863 |
| 2,499,868 A * | 3/1950 | Kinskie | 119/831 |
| 2,605,744 A * | 8/1952 | Urbanski | 119/863 |
| 4,240,414 A * | 12/1980 | Theisler | 602/26 |
| 4,266,511 A * | 5/1981 | Muench | 119/858 |
| 4,355,600 A | 10/1982 | Zielinski | |
| 4,698,852 A * | 10/1987 | Romero | 2/171 |
| 4,722,171 A * | 2/1988 | Meroth | 54/6.1 |
| 4,937,885 A * | 7/1990 | Gregg | 2/209.11 |
| 4,974,549 A * | 12/1990 | Gordon | 119/793 |
| 5,040,244 A * | 8/1991 | Tubbs | 2/237 |
| 5,137,508 A | 8/1992 | Engman | |
| 5,389,061 A * | 2/1995 | Nor | 600/15 |
| 5,399,153 A * | 3/1995 | Caprio et al. | 602/26 |
| 5,463,985 A | 11/1995 | Shover | |
| 5,624,388 A * | 4/1997 | Lehr | 602/20 |

(Continued)

FOREIGN PATENT DOCUMENTS

DE  10045946 A1 *  5/2002

OTHER PUBLICATIONS

Webster, Flat, http://www.webster.com/dictionary/flat, p. 1.*

*Primary Examiner*—Michael R. Mansen
*Assistant Examiner*—Joshua J Michener
(74) *Attorney, Agent, or Firm*—Taylor & Aust, P.C.

(57) ABSTRACT

An animal face wrap including a single flexible band and at least one constrictor associated with the band.

13 Claims, 9 Drawing Sheets

U.S. PATENT DOCUMENTS

| | | | |
|---|---|---|---|
| 5,640,721 A * | 6/1997 | Jackson | 2/171 |
| 5,701,608 A | 12/1997 | Kohn | |
| 5,782,743 A * | 7/1998 | Russell | 600/9 |
| 5,792,093 A | 8/1998 | Tanaka | |
| 5,822,800 A * | 10/1998 | Anderson | 2/202 |
| 5,920,909 A * | 7/1999 | Ellsworth et al. | 2/171 |
| 5,941,199 A | 8/1999 | Tamura | |
| 5,984,855 A * | 11/1999 | DiNapoli | 600/15 |
| 5,992,352 A * | 11/1999 | Borchelt et al. | 119/856 |
| 6,044,802 A * | 4/2000 | Schmid et al. | 119/856 |
| 6,050,931 A * | 4/2000 | Russell | 600/15 |
| 6,058,890 A | 5/2000 | Harrell | |
| 6,093,143 A * | 7/2000 | Nagler | 600/15 |
| 6,174,277 B1 * | 1/2001 | Nichols | 600/15 |
| 6,209,140 B1 * | 4/2001 | Ebeling | 2/207 |
| 6,306,076 B1 * | 10/2001 | Gill | 600/15 |
| 6,318,054 B1 | 11/2001 | Gatto | |
| 6,390,026 B1 | 5/2002 | Sollock | |
| 6,553,945 B2 * | 4/2003 | Rice | 119/821 |
| 6,610,023 B2 * | 8/2003 | Steponovich | 602/26 |
| 7,131,400 B2 * | 11/2006 | Wanveer et al. | 119/792 |
| 2002/0046715 A1 * | 4/2002 | McCarville | 119/858 |
| 2002/0073936 A1 * | 6/2002 | Fields-Babineau | 119/863 |
| 2002/0143231 A1 * | 10/2002 | Kulish | 600/15 |
| 2004/0050577 A1 * | 3/2004 | Manison | 174/108 |
| 2006/0111606 A1 * | 5/2006 | Yee | 600/15 |

* cited by examiner

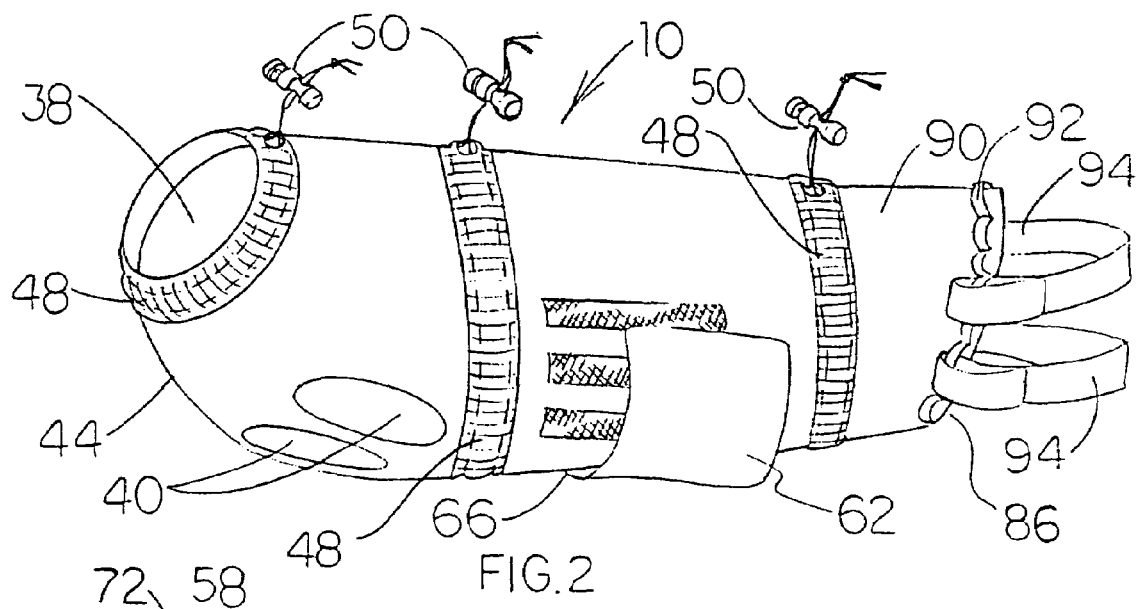
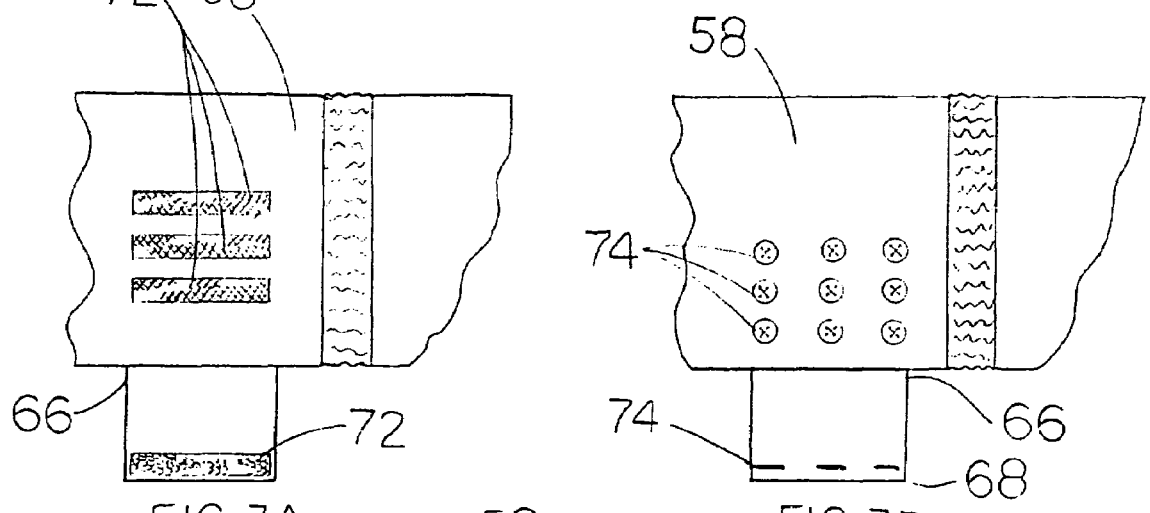
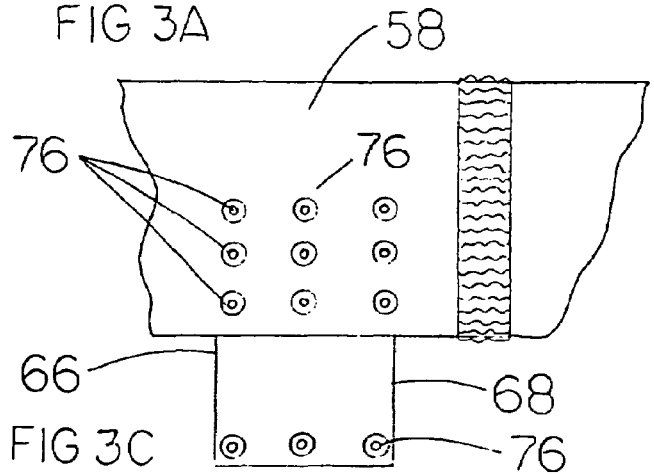

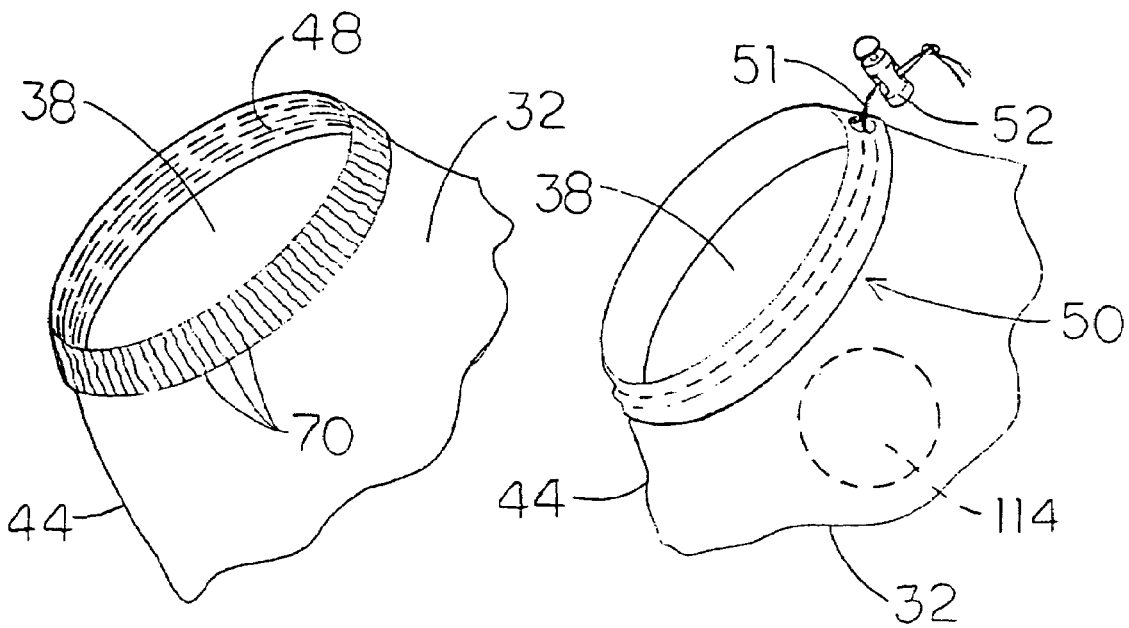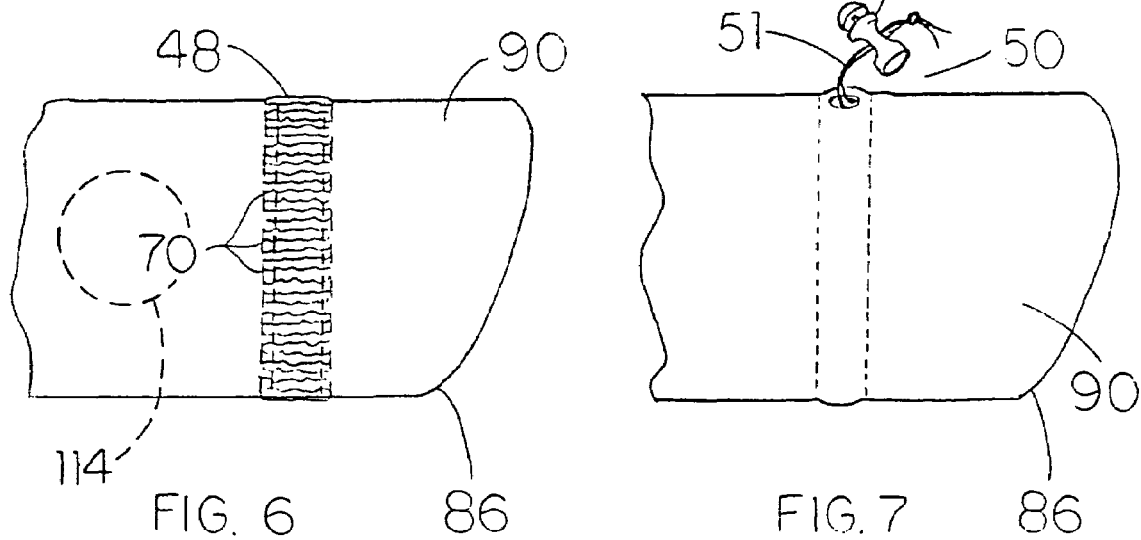

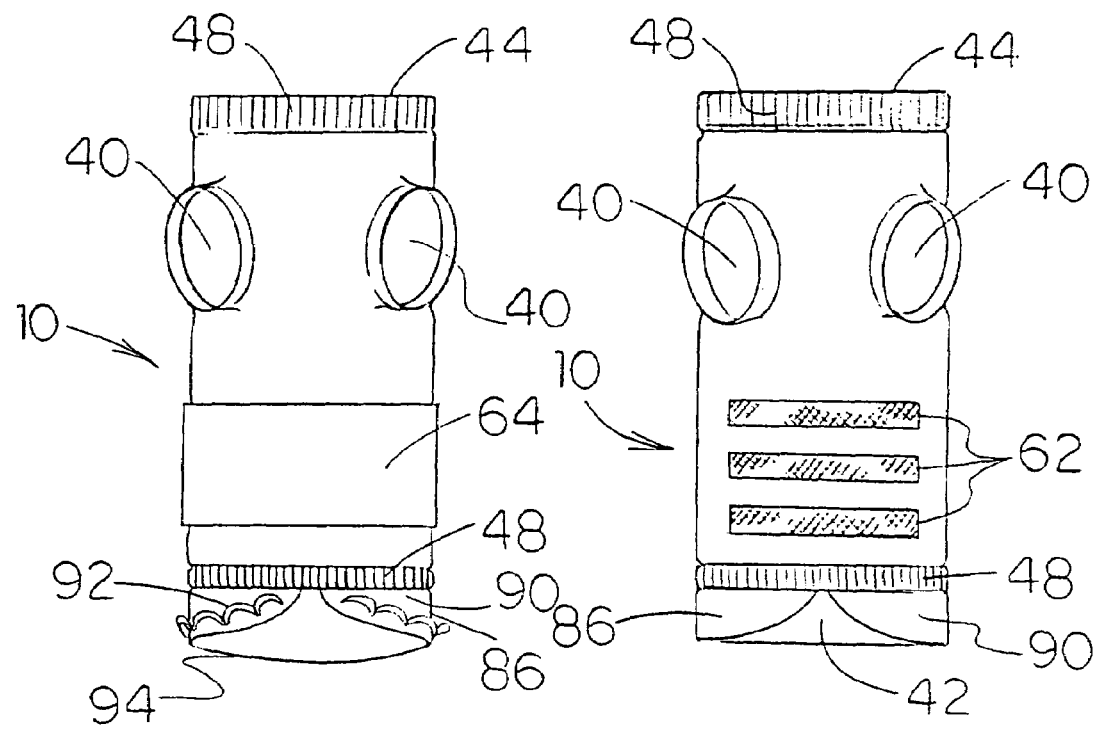
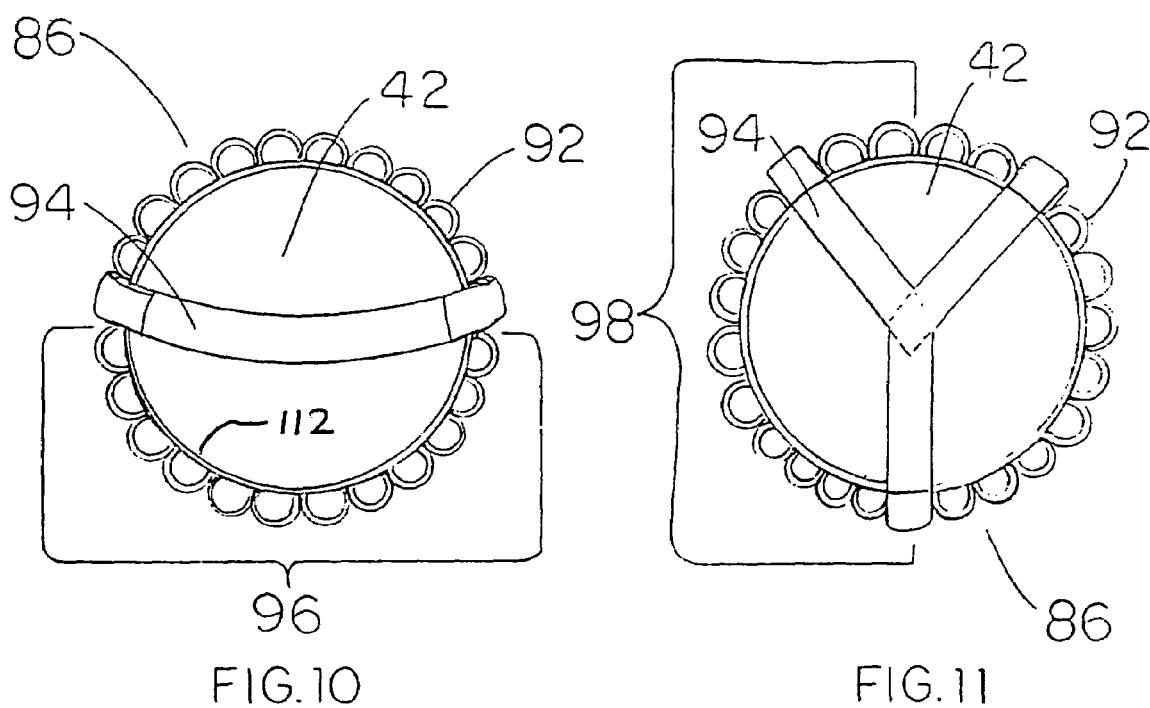

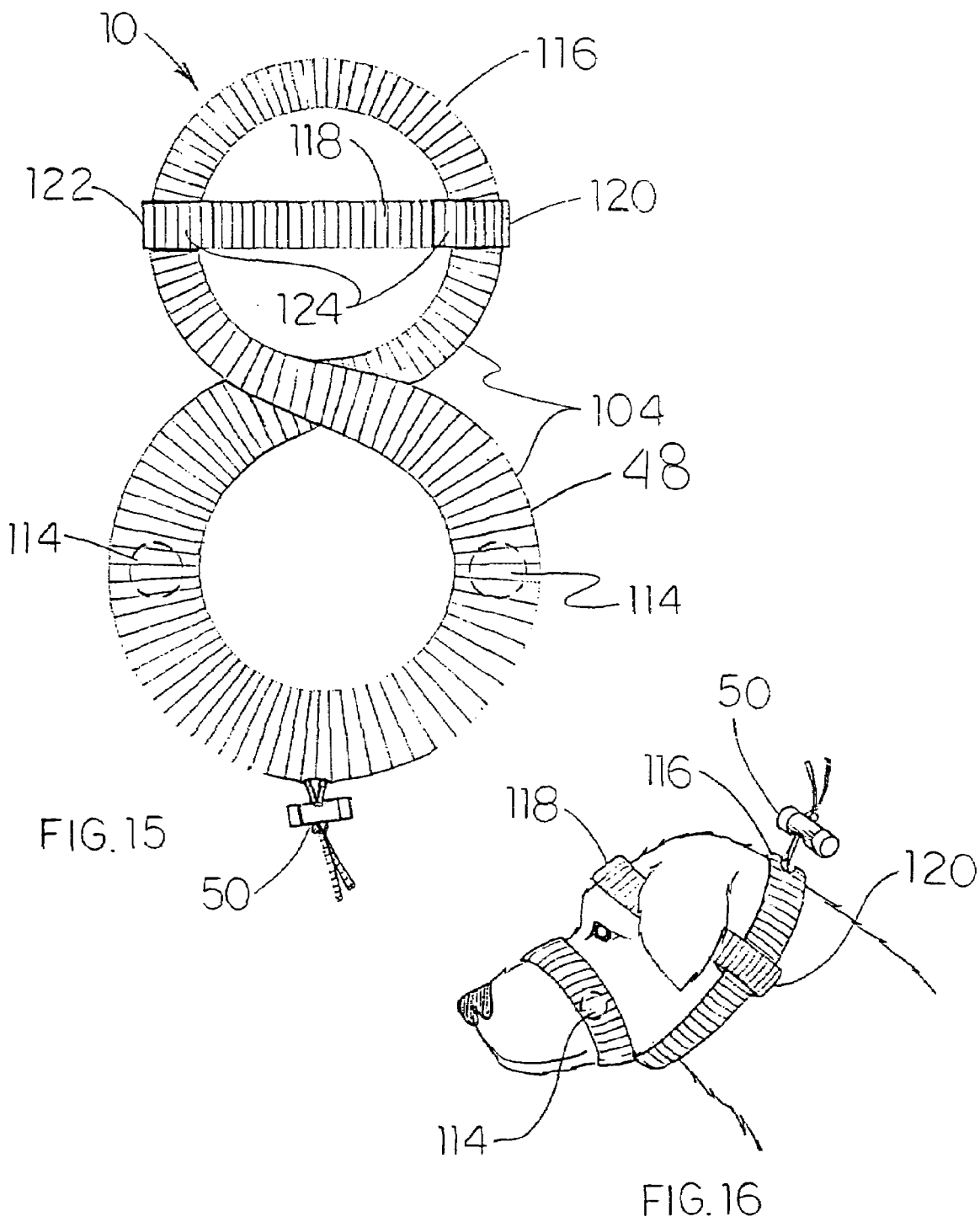

ANIMAL FACE WRAP AND METHOD OF USING

CROSS REFERENCE TO RELATED APPLICATIONS

This is a continuation-in-part of U.S. patent application Ser. No. 09/797,011, entitled "ANIMAL GARMENT", filed Mar. 1, 2001 now U.S Pat. No. 6,820,574.

BACKGROUND OF THE INVENTION

The present invention relates to an animal garment and more particularly to an animal garment which selectively applies pressure to known animal acupressure points to control the behavior of the animal.

The use of acupressure on humans can be traced to the practitioners of traditional Chinese medicine ill ancient China. Traditional Chinese medicine has been relied upon by doctors to diagnose disease and treat illness in ancient China. This practice of medicine evolved as an extension of contemporary lifestyle in the third and fourth centuries B.C. As the practitioners of ancient China studied the world around them, they discerned connections between major forces in nature and specific internal organ systems of animals. Based on perceived similarities between the natural elements and the body, these practitioners developed a concept of health care that encompassed both systems.

Using all of their senses, practitioners of traditional Chinese medicine used the interwoven systems to both diagnose and treat illnesses. In order to do this, traditional Chinese medicine utilized herb therapy, food therapy, acupressure and massage techniques in all diagnosis and treatment.

In keeping with the interwoven relation of bodily systems, acupressure meridians channel energy in courses beneath the surface of the skin to connect the circulation, lymphatic, muscular, and nervous systems into a network that connects all parts of the body. Along each course, there are highly reactive points (acupressure points) that serve as relay switches to access the Chi energy that flows through the power lines that are the meridian. Just as each meridian is associated with an internal organ, the acupressure points provide surface access to the organ systems.

While there are other recognized tools of alternative medicine that are in accord with the bioethical principals of this new approach to improving animals' health and well being, much improvement is needed and will be achieved when certain bioethical principles that constitute the rights of animals become part of the heart and moral fabric of society. These principals are: right breeding (to avoid harmful hereditary diseases); right socialization and rearing; right handling and understanding; and right environment and nutrition. Acupressure is adjunctive and complementary to these bioethical principles. Acupressure is not a panacea, but it can play a vital role in helping animals cope with chronic degenerative diseases, during convalescence from some acute disease or surgery, and work through all sorts of anxiety based disorders.

Scientific research into the nervous system and how it operates now confirms that both humans and animals have a nervous system which includes neurons or nerve cells interconnected with the brain in a network resembling a telephone system with trillions of miles of complicated wiring along which small electrical signals travel. Communication with the brain also has been demonstrated on a cellular basis which either partially explains or supplements the nerve communication system of the body. Every cell has many ligand receptors. The receptors may be of many different kinds. The receptors basically function as sensing molecules. The receptors operate through bound amino acids and attached ligands to communicate cell to cell throughout the body. These ligands may be neurotransmitters, steroids or peptides. Peptides make up the majority of ligands in the body, and regulate most life processes. Peptides have been found in all areas of the body, and peptides generated in one part of the body are free to travel through the blood and cerebrospinal fluid to bind to receptors on cells in a different part of the body. Receptors are most concentrated in the parts of the body where the five senses receive stimuli, in what are called nodal points. The nodal points are designed to be accessed or modulated by almost all known peptides in order to prioritize or bias the information to be passed to the cell. Physical stimuli can cause a cell to secrete a certain peptide that travels to the brain to bind with its receptor in a way that begets a specific emotional response. The opposite is also true: peptides produced in the brain can travel throughout the body and bind with cells in a way that begets a specific physiological response. What has been found suggests that peptides serve to weave the body's organs and systems in to a single web that reacts to both internal and external environmental changes with complex and subtly orchestrated responses. When these receptors receive a message, they begin any number of activities. These activities can translate into large changes in behavior, physical activities or even mood swings in both humans and animals. While prior to 1960, all brain functions were believed to be determined by synaptic connections between billions of neurons, now, it is believed that information exchange also occurs on a purely chemical, non-synaptic communication between cells and that all of the organs of the body are actually joined to each other in a bidirectional network of communication linked by information carriers known as neuropeptides. However the exact methods of communication the body utilizes still remains a mystery.

The term "acupressure" is used herein to refer to the use of physical stimuli in the form of pressure on these receptors or acupressure points and utilizing both the neuron and neuropeptide communication system to control or to alter or to modify behavior in animals. The term "behavior" is used herein to refer to the actions of an animal, as distinguished from emotion. The term "emotion" is used to refer to feelings, sensations, thoughts, drives, tendencies, etc., such as anger, fear, sadness, joy, contentment, pain, hunger, thirst and the like. Such emotion is distinguished from behavior such as barking, biting, enhancement of the immune system and reactional behavior from fear and anxiety.

In recent years, acupressure has been utilized to deal with all sorts of animals: dogs, cats, horses, orangutans, hamsters, snow leopards, elephants, alligators, cockatoos, lames, cheetahs, etc. Recently, practitioners have been using acupressure techniques to help animals with several problems. It aids recovery from injury, reduces stress, calms reactions to loud noises, tones down aggressive or fearful behavior, reduces shock, helps overcome whelping difficulty, reduces fear biting, reduces stiffness, and accomplishes relaxation for animals training for animal companion therapy in rest homes and hospitals and the like.

Conventionally, acupressure techniques are administered ad hoc by a person trained in the acupressure concepts of traditional Chinese medicine, or by a person knowledgeable about the locations of the various meridians and their relative pressure points. While personal administration of the techniques provide several benefits, such benefits are not exclusive to personal administration of the techniques. These benefits may be realized whenever the pressure points or receptors are contacted in a meaningful way. A drawback to personal administration of the techniques is that the treatment requires a considerable time commitment to change behavior. In the event that the pressure points may be contacted continuously for short periods of time, the treated animal experiences the beneficial effects in changing habitual behavior. Such continuous contact is not practical by personal administration of the techniques, but is possible to achieve with items placed on the animal positioned in relation to various meridians and their respective pressure points. This is especially so when such items provide an optimum amount of pressure to the pressure points or receptors for accessing and positively affecting the Chi energy of the animal. An example of an item that is both possible and practical for this purpose is a specially designed garment.

It is therefore highly desirable to provide a new and improved animal garment with which animals of all kinds may be treated in accordance with the traditional medicinal concepts of acupressure.

It is also highly desirable to provide a new and improved animal garment which is utilized for applying pressure to various acupressure points or receptors on the animal when worn. It is also highly desirable to provide a new and improved animal garment which can be utilized to provide pressure to various acupressure points or receptors on the animal with various amounts of pressure when worn. It is also highly desirable to provide a new and improved animal garment for reducing symptoms of stress. It is also highly desirable to provide a new and improved animal garment which can be used to enhance recovery from injury by altering an animal's behavior. It is also highly desirable to provide a new and improved animal garment which can be utilized to calm an animal's reaction to loud noises. It is also highly desirable to provide a new and improved animal garment which can be utilized to reduce aggressive or fearful animal behavior. It is also highly desirable to provide a new and improved animal garment which can be utilized to reduce shock behavior. It is also highly desirable to provide a new and improved animal garment which can be utilized to reduce fear biting. It is also highly desirable to provide a new and improved animal garment which can be utilized to reduce the stress and anxiety of animal training. It is also highly desirable to provide a new and improved animal garment which can be utilized to reduce the stress and anxiety associated with physical treatment. It is highly desirable to provide a new and improved animal garment which can be utilized to reduce all sorts of behavior. Finally it is highly desirable to provide a new and improved animal garment which can be utilized to change animal behavior in all of the above instances.

SUMMARY OF THE INVENTION

The present invention provides an animal garment and more particularly an animal garment which selectively applies pressure to known animal acupressure points to control the behavior of the animal.

The invention comprises, in one form thereof, an animal face wrap including a single flexible band and at least one constrictor associated with the band.

An advantage of the present invention is that the invention to provides a new and improved animal garment with which animals of all kinds may be treated in accordance with the traditional medicinal concepts of acupressure.

Another advantage is that the present invention to provides a new and improved animal garment which is utilized for applying pressure to various acupressure points or receptors on the animal when worn.

The present invention advantegeously provides pressure to various acupressure points or receptors on the animal with various amounts of pressure when worn.

The present invention advantageously provides an animal garment for reducing symptoms of stress.

Yet another advantage of the present invention is to provide a new and improved animal garment which can be used to enhance recovery from injury by altering an animal's behavior or enhancing the immune system.

Other advantages of the present invention include reducing an animal's reaction to loud noises, reducing aggressive or fearful animal behavior, reducing shock behavior, reducing fear biting, reducing the stress and anxiety of animal training, reducing the stress and anxiety associated with physical treatment.

In the broader aspects of the invention, there is provided a new and improved animal garment for contacting various acupressure points of its wearer. In other aspects of the invention, there is provided a new and improved animal garment with an elastic or adjustable collar, an elastic or adjustable belly flap, an elastic or adjustable lumbar band, and means for securing the garment to the wearer.

BRIEF DESCRIPTION OF THE DRAWINGS

The above mentioned and other features and objects of the invention and the manner of attaining them will become more apparent and the invention itself will be better understood by reference to the following description of an embodiment of the invention taken in conjunction with the accompanying drawings, wherein:

FIG. 2 is a perspective view of a new and improved animal garment showing a plurality of constrictors and two tail flaps for applying varying degrees of pressure to various acupressure points;

FIG. 3A is a fragmentary side view of a belly flap constrictor of the new and improved animal garment having a hook and eye mechanism as means for removably connecting the distal end of the belly flap to the mid-section of the garment;

FIG. 3B is a fragmentary side view of a belly flap constrictor of the new and improved animal garment having buttons as a means for removably connecting the distal end of the belly flap to the mid-section of the garment;

FIG. 3C is a fragmentary side view of a belly flap constrictor of the new and improved animal garment having snaps as a means for removably connecting the distal end of the belly flap to the mid-section of the garment;

FIG. 4 is a fragmentary perspective view of the neck opening of the new and improved animal garment defined by an elastic band constrictor;

FIG. 5 is a fragmentary perspective view of the neck opening of the new and improved animal garment having a string-type adjustable constrictor adjacent to the neck opening;

FIG. 6 is a fragmentary side view of an elastic band constrictor located about the rear end of the garment FIG. 7 is a fragmentary side view of a string-type adjustable constrictor about the rear end of the garment;

FIG. 8 is a bottom view of the new and improved animal garment having a neck constrictor, belly flap constrictor, and a rear end constrictor;

FIG. 9 is a bottom view of the new and improved animal garment having a plurality of elastic bands secured to the sheet material at the interior of the belly portion of the garment;

FIG. 10 is a rear view of the new and improved animal garment showing a tail flap connected to slots on horizontally opposite sides of the rear opening;

FIG. 11 is a rear view of the new and improved animal garment showing a Y-shaped tail flap connected to slots on vertically opposite sides of the rear opening;

FIG. 15 is a planar view of a face wrap of the present invention;

FIG. 16 is a partial view of an animal having the face wrap of FIG. 15 positioned around its neck, forehead and muzzle;

DETAILED DESCRIPTION OF THE INVENTION

Figure 1:
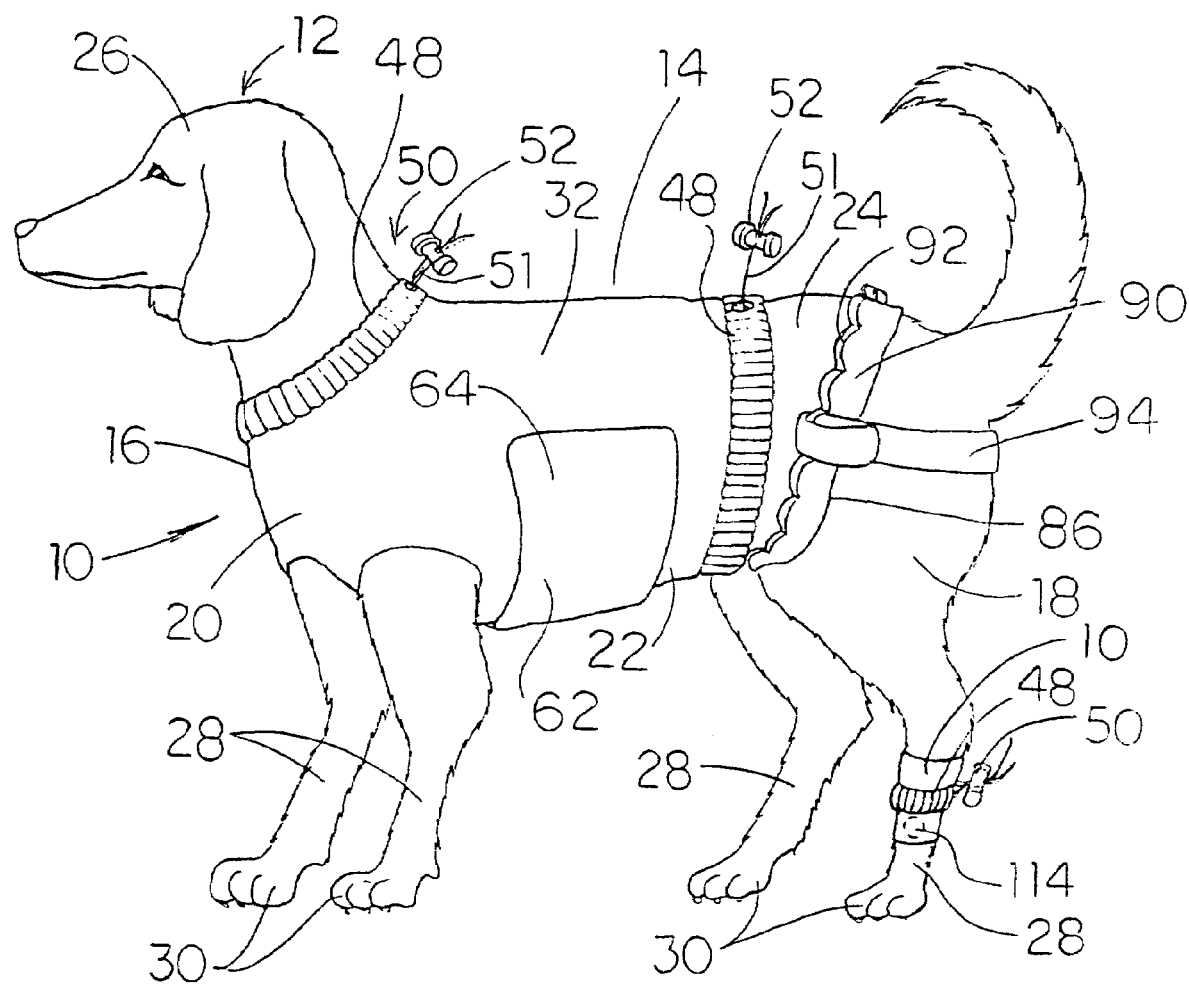
FIG. 1 is a perspective view of a new and improved animal garments as worn by a wearer.

FIGS. 1 and 2 illustrate the new and improved animal garment of the present invention. These figures show an animal garment 10 that is put on the wearer 12 like a pull-over shirt, and that substantially conforms to the torso 14 of the wearer 12, extending generally from the neck and shoulders 16 of the wearer 12 to the hind-quarters 18 of the wearer and generally covering the chest 20, mid-section 22 and lumbar areas 24 of the wearer 12 (see FIG. 1). In a specific embodiment, the garment may also generally cover the head 26 (see FIG. 1) or one of the legs 28 of the wearer (see FIG. 1). In other specific embodiments, the garment may generally cover all or portions of the legs 28 and/or feet 30 of the wearer.

In order to conform to the torso of the wearer, the garment 10 is manufactured of a resiliently expandable and flexible sheet material 32. Along the length of the garment 10 is one or a series of constrictors generally positioned over known acupressure points of the wearer. Each constrictor may have application to a plurality of acupressure points, or may be specifically located to apply pressure to a specific acupressure point. The resiliently expandable and flexible sheet material 32 of which the garment 10 is manufactured may have a resiliency or spring constant such that the sheet material itself acts as a general constrictor of several acupressure points by applying a low level of pressure to the portions of the body of the wearer 12 covered by the garment 10. Other constrictors may employ the use of resiliently expandable and flexible bands, strings, cords, pads and any other material or device that may be incorporated into the garment that may be used to focus pressure to a specific area of the wearer of the garment.

Referring now to FIG. 2, a new and improved animal garment 10 is shown with a neck opening 38, front leg openings 40 and a rear opening 42. In the garment of the present invention, the neck opening at the front end 44 of the garment 10 contains at least one constrictor for applying a desired amount of pressure to known acupressure points in the neck or shoulder area of the wearer and at least one constrictor for applying a desired amount of pressure to known acupressure points in the chest area of the wearer. In a specific embodiment, these constrictors may comprise the resiliently expandable sheet material of the garment 10 as a general constrictor for applying a low level of pressure. In other specific embodiments, the neck and chest area constrictors may instead or additionally comprise an elastic band 48 of desirable width for applying a higher level of pressure. In yet other specific embodiments, the neck and chest area constrictors may instead or additionally be adjustable. The adjustable constrictor shown in FIGS. 1, 2, 5. and 7 comprise a string-type adjustable constrictor 50 in which an elastic or static string, cord, or rope 51 is connected to the garment 10 adjacent to the neck opening 38 or in the chest area, which string, cord, or rope 51 may fixably and adjustably constrict the neck opening 38 by means of a slipknot, sliding lock appliance 52 or any other mechanism or means for adjustably fixing the amount of constriction of this stringtype adjustable constrictor 50 around the neck or chest for applying a still higher level of pressure. The word "elastic" as used herein is meant at least resiliently expandable and flexible. The word "static" as used herein refers to relatively nonexpandable chord or filament structures.

Referring now to FIG. 4, in a specific embodiment, the neck opening 38 is defined by an elastic band 48 connected to the garment 10. Referring now to FIG. 5, in other specific embodiments, the girth of the neck opening 38 may be constrictably adjusted by an adjustable constrictor adjacent to the neck opening 38. In a specific embodiment, the adjustable constrictor is an elastic or a static stringtype constrictor 50. In yet other specific embodiments, the constrictors about the neck opening comprise an elastic band 48 and a string-type constrictor connected adjacent to or overlaying each other.

Figure 12:
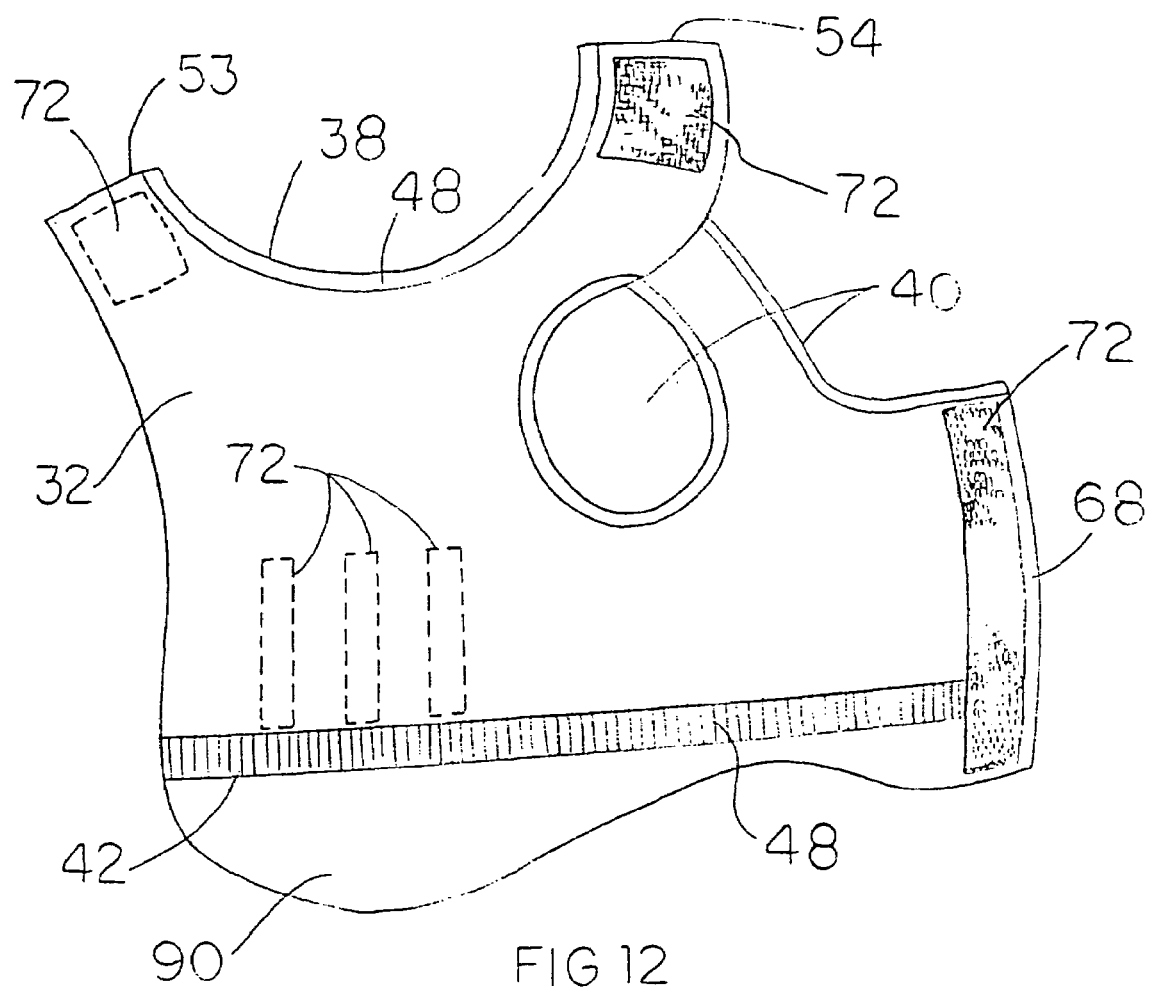
FIG. 12 is a layout view of one version of the new and improved animal garment in which the neck opening and the mid-section of the garment may be opened for ease in putting on and taking off the garment by the removable connection of various distal flaps.
Figure 13:
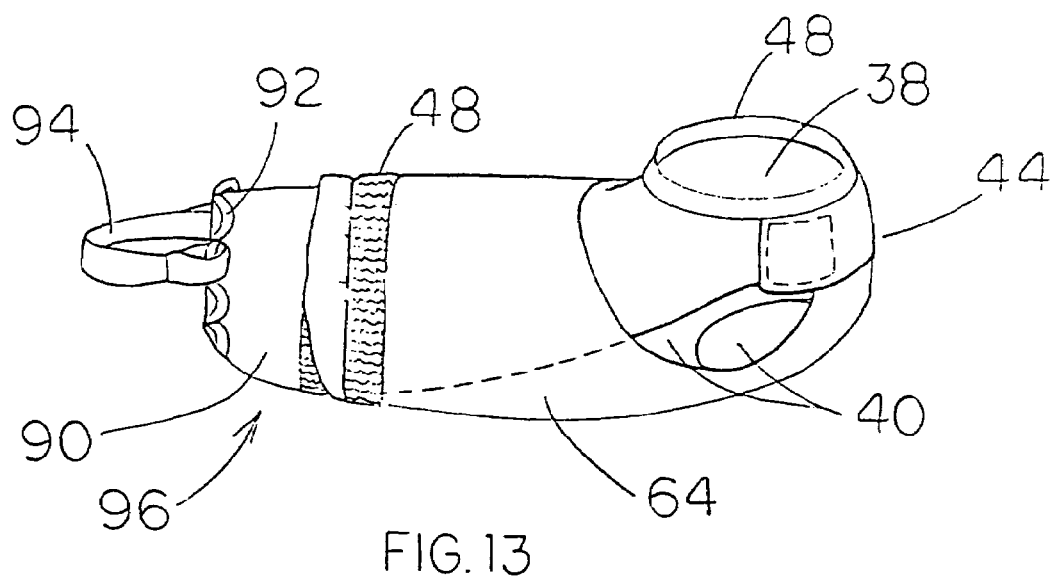
FIG. 13 is a side view of the new and improved animal garment of FIG. 12 in closed form.
Figure 14:
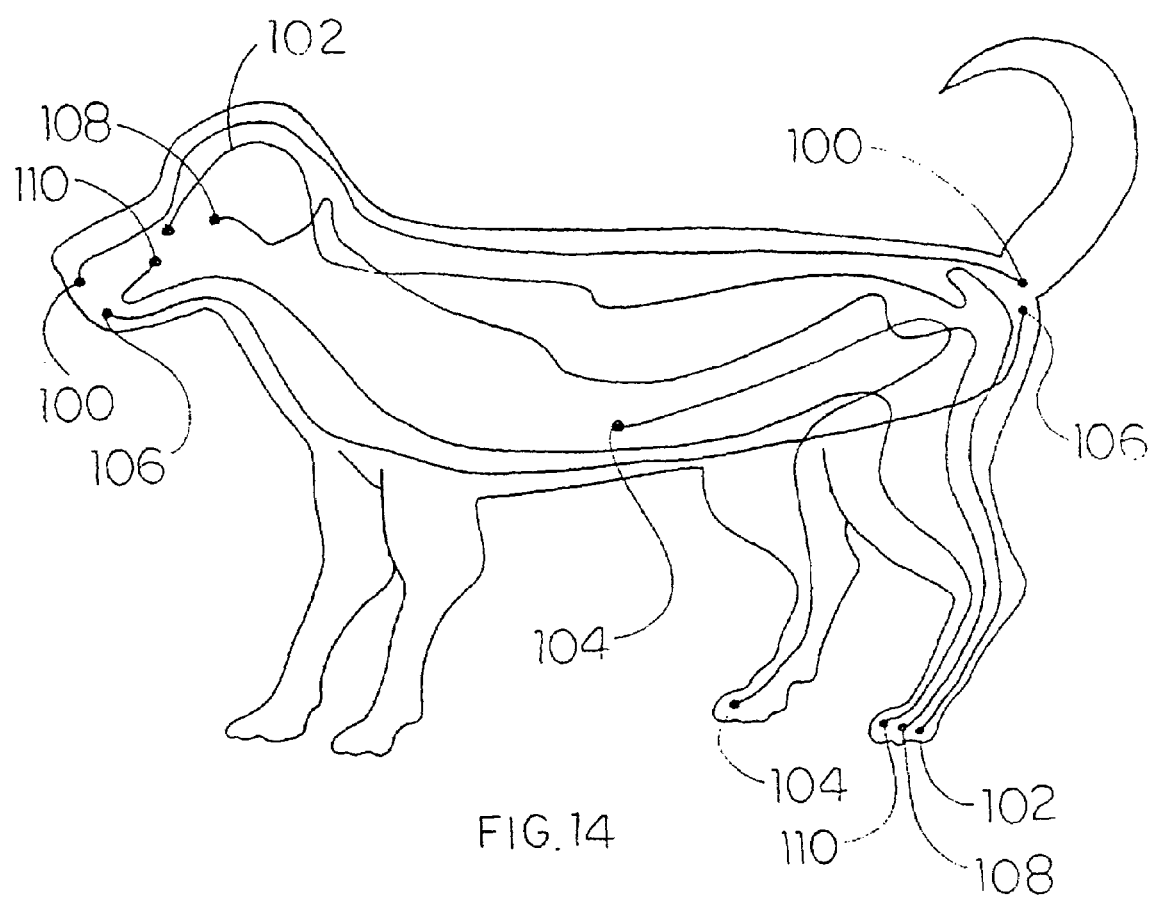
FIG. 14 is an internal view of the wearer of the new and improved animal garment showing various acupressure meridians.

Referring now to FIGS. 12 and 13, in another version of the garment 10, the adjustable constrictor comprises two distal flaps 53, 54 contiguous with the front end 44 of the garment 10 with means 56 for adjustably and removably connecting the distal flaps 53, 54 to define the neck opening 38 and to apply a desired amount of pressure to known acupressure points in the neck or shoulder area 16 of the wearer 12. The removable connection 56 of the distal flaps 53, 54 enables a person putting the garment 10 on the wearer 12 to open the garment at the neck opening 38 for ease in accomplishing this task. In other specific embodiments, the removable connection 56 of the distal flaps 53, 54 also completes an elastic band 48 secured adjacent to the neck opening 38 of the garment 10.

Referring again to FIGS. 2 and 3, a new and improved animal garment 10 is shown with a constrictor 62 positioned at the mid-section 58 of the garment for applying a desired amount of pressure to acupressure points in the belly 60 and midsection area 22 of the wearer 12. In a specific embodiment, the mid-section constrictor 62 comprises a belly flap 64 manufactured of a resiliently expandable and flexible sheet material 32, having one end 66 connected to one side of the midsection 58 of the garment and a distal end 68 that is stretched and adjustably positioned across the belly 60 of the wearer, the distal end 68 of the belly flap 64 being removably connected to the opposite side of the mid-section of the garment 10 from the connected end 66.

In the specific embodiments of the invention, any aspect that requires or permits the removable connection 56 of distal ends, distal flaps, or any other element described herein as being removably connected, achieving removable connection is accomplished by use of one or a series of discrete fasteners. Examples of such fasteners include dual hook-and-eye mechanisms 72 such as Velcro®, buttons and button holes 74, snaps 76, zippers, pins, safety pins, and adhesive strips. FIGS.

3A-3C show various means for achieving removable connection of the distal end 68 of a belly flap constrictor 64.

FIGS. 12 and 13 show a specific embodiment in which the connected end 66 of the belly flap 64 is a contiguous portion of the garment 10 such that disconnection of the distal end 68 of the belly flap opens the garment from one end to the other end for ease of putting the garment on the wearer 12.

In the embodiment of FIG. 9, the constrictor 62 about the mid-section of the wearer comprises resiliently expandable and flexible bands 48 constrictably connected to the portion of the garment covering the belly 60 of the wearer 12 such that when the band 48 is in a neutral or an at rest state with respect to stretching, the sheet material 32 at the mid-section of the garment to which the band is connected contains multiple folds and wrinkles 70.

Referring now to FIGS. 6 and 7, a new and improved animal garment 10 may have various types of constrictors at the rear end 86 for applying various degrees of pressure to the wearer in the lumbar area 24 of the wearer. The constrictors about the rear end may comprise the sheet material 32 for applying a low level of pressure, an elastic band 48 of desirable width for applying a higher level of pressure, and/or an adjustable constrictor, such as a string-type adjustable constrictor 50, for applying up to a still higher level of pressure. In a specific embodiment, the rear end constrictors comprise an elastic band 48 and a string-type adjustable constrictor 50 connected adjacent to or overlaying each other.

Referring now to FIG. 8, the garment 10 has a static band 48 connected adjacent to the rear opening 42. In other specific embodiments, an elastic band 48 and/or an adjustable string type constrictor 50 are positioned adjacent to or overlaying each other at the rear opening 42. In other specific embodiments, a lumbar portion 90 of the garment 10 extends outwardly from the rear opening 42 longitudinally of the mid-section 58 of the garment. As shown in FIGS. 8 and 10, this lumbar portion 90 has a strip 112 sacred to garment 10 adjacent to rear opening 42 defining a plurality of slots 92 positioned circumferentially around it, and one or more resiliently expandable and flexible tail flap 94 adjustably and removably connected to slots 92 on horizontally opposite sides 96 of the rear opening 42. See FIGS. 2 and 10. These tail flaps 94 may be connected (1) to secure the position of the garment 10 about the hind-quarters area 18 of the wearer 12, (2) to apply a desired amount of pressure to acupressure points in the hind-quarters area 18 of the wearer 12, (3) to restrict movement of the tail by arranging each of the flaps 94 about the tail of the wearer 12, or (4) any combination of (1) through (3). In the embodiment of FIG. 11, the tail flap 94 may be adjustably and removably connected to the slots 92 in the lumbar portion on vertically opposite sides 98 of the rear opening 42 such that the tail flap 94 extends between the rear legs of the wearer to attach to slots 92 at the top of the lumbar portion 90.

The amount of pressure applied by the tail flap 94 can be adjustably determined by utilizing elastic band 48 adjacent the rear opening 42 and elastic straps in constructing the tail flap 94. By choosing different elasticity constants of the band 48 and the strap 94 and the adjustability of the tightness of the band, a variety of amounts of pressure can be applied by the tail flap 94.

The animal garment 10 of the invention can also apply varying amounts of pressure to localized acupressure points as desired.

In addition to the desired levels of pressure than can be applied by the resiliency of the garment 10 and the resiliency of the bands 48 and the chords 51, pressure may be applied to specific acupressure points 36 by the use of either static or elastic or magnetic pads 114. See FIGS. 1, 5, 6, 15 and 16. These pads are shown in the form of cylindrical discs of either static or elastic material sewn, adhesively or otherwise attached to the inside of the garment 10. These pads 114 may be of a variety of thicknesses and may have elastic constants of a wide range so as to apply the correct pressure in combination with the elastic or static nature of the garment 10 and various strengths of a magnetic field where desired at a specific acupressure point 36. Pads 114 can also be utilized in combination with the bands 48 and the string-type adjustable constrictors 50 by laying the bands 48 and string-type constrictors 50 over the pads 114. Each of the garments 10 will be designed to have the proper bands 48, constrictors 50 and pads 114 strategically placed in accordance with the anatomy of the animal wearer 12 to accomplish specific purposes desired in accordance with the invention.

In operation, the animal garment 10 of FIG. 1 is designed to apply desired levels of pressure to known acupressure points 36 along known acupressure meridians of the wearer. Each meridian has a multitude of acupressure points or receptors 36 between their opposite ends. In a specific embodiment, the animal garment applies a desired amount of pressure to known pressure points or receptors along the Governing Vessel acupressure meridian 100 of the wearer. In other specific embodiments, the animal garment applies a desired amount of pressure to known pressure points or receptors along the Bladder acupressure meridian 102 of the wearer. In other specific embodiments, the animal garment applies a desired amount of pressure to known pressure points or receptors along the Liver acupressure meridian 104 of the wearer. In other specific embodiments, the animal garment applies a desired amount of pressure to known pressure points or receptors along the Conception Vessel acupressure meridian 106 of the wearer. In other specific embodiments, the animal garment applies a desired amount of pressure to known pressure points or receptors along the Gall Bladder acupressure meridian 108 of the wearer. In other specific embodiments, the animal garment applies a desired amount of pressure to known pressure points or receptors along the Stomach acupressure meridian 110 of the wearer.

Referring now to FIGS. 15 and 16, the animal garment 10 of the invention may also be a face wrap 116. Face wrap 116 includes a single continuous length of an elastic band 116 as shown in FIG. 16 together with a forehead band 118. The forehead band 118 includes opposite ends 120 and 122 which are wrapped around band 116 and secured to the forehead band 118 at 124. The securance of the forehead band 118 at 124 may be by stitching, or any of the fasteners above described such as hook and eye mechanisms, buttons, snaps, zippers, pins, adhesive strips and the like. In a specific embodiment, both band 116 and band 118 maybe provided in the form of any of the above described constrictors. In a specific embodiment, elastic band 116 of the face strap 116 shown in FIG. 16 has one-half of its length having a width which is twice the width of the other half of the band 116. This allows for the band to fit all sizes of animals.

Referring to FIG. 2, the animal garment of the invention may also be a sleeve of resiliently expandable and flexible sheet material into which a leg of the animal may be positioned. In a specific embodiment, this sleeve may be separate from another garment 10 as shown in FIG. 1 or may be secured to the leg openings 40 or the rear opening 42 of the body garments 10 shown in FIGS. 1, 2, 12 and 13.

In the operation of the animal garment 10 of the present invention, each constrictor 48, 50, 62, 114 or any combination thereof, is chosen in accordance with the amount of pressure that is desired to be applied in the specific area of the wearer. In a specific embodiment, a low amount of pressure is generally applied by resiliently expandable and flexible sheet material 32 of the garments 10. In other specific embodiments, a higher amount of pressure is applied by adjustably stretching the resiliently expandable and flexible sheet material across a portion of the wearer as with constrictor 62 either in the form of gathered material or a belly flap as disclosed above, and removably fixing the position of the stretched material. In other specific embodiments, an elastic or static band 48 comprising a resiliently expandable and flexible material is used as a constrictor to apply a still higher amount of pressure. In other specific embodiments, an adjustable constrictor 50 is used to apply a still higher amount of pressure to the wearer. A string-type adjustable constrictor 50 applies the still higher amount of pressure when the constriction of the string, cord, or rope 51 is adjustably and fixably set by a slipknot, sliding lock appliance 52, or other mechanism or device for fixably setting the constriction is utilized. In other specific embodiments, the string type adjustable constrictor 50 is manufactured of a resiliently expandable and flexible or static material for applying still higher amounts of pressure to the wearer. In still other specific embodiments, pads 114 of different static or elastic materials of differing thickness may be used in conjunction with the garment 10 to apply various amounts of pressure to specific acupressure points as desired. Pads 114 may be overlaid with constrictors 48, 50 or 62.

The band 104 is positioned over the animal's muzzle, around the animal's neck. If desired, the forehead band may be secured to the face wrap 116 by the looped ends 120, 122 as shown in FIG. 15 and positioned over the forehead as shown in FIG. 16. By means of a resiliently expandable band 104 or one or more of the constrictors 48, 50, 62, 114 above described, various amounts of pressure may be supplied to the acupressure points or receptors located in the neck, muzzle and forehead areas as desired.

Figure 17:
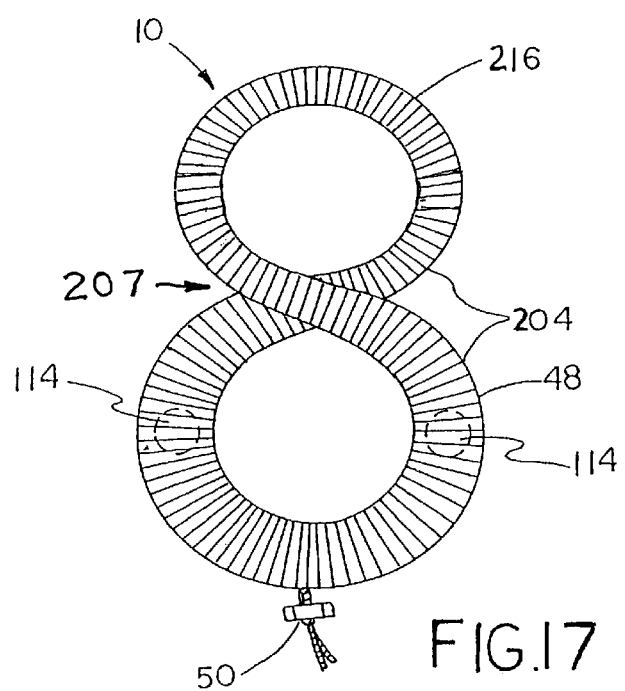
FIG. 17 is a planar view of another face wrap of the present invention.
Figure 18:
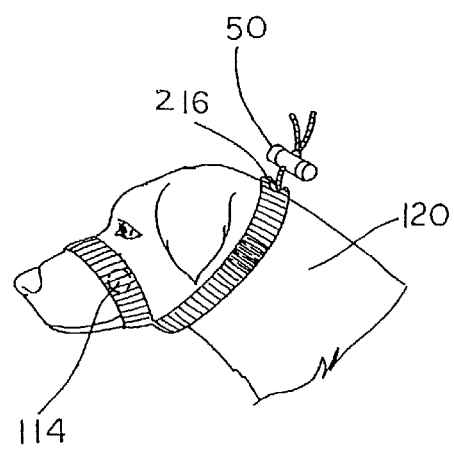
FIG. 18 is a partial view of an animal having the face wrap of FIG. 17 positioned around its neck and muzzle.

Referring now to FIGS. 17 and 18, there is illustrated yet another embodiment of the present invention in which animal garment 10 is a face wrap 216. Face wrap 216 may take the form of a single continuous length of elastic band 204 as shown in FIG. 17. Face wrap 216 has a crossover zone 207, as shown in FIG. 17, that is unconstrained. Elastic band 204 is free to slide over itself in zone 207. Face wrap 216 has a figure-8 shape and is substantially flat. Magnetic pads 114 are strategically positioned in band 204 to be located at desired locations on animal 120. Pads 114 may protrude to apply additional pressure to portions of animal 120, thereby having a dual function of supplying a magnetic field and applying accupressure. Band 216 may additionally be provided in the form of any of the above described constrictors. In a specific embodiment, elastic band 216 as shown in FIG. 17 has one-half of its length having a width which is twice the width of the other half of band 216. This advantageously allows for the band to fit a broad range in sizes of animals. Band 216 is positioned over the muzzle of animal 120, and around the animal's neck. By means of a resiliently expandable band 204 and/or constrictors 48 and 50 described above, various amounts of pressure may be supplied to the acupressure points or receptors located in the neck and muzzle areas of animal 120 as desired.

Figure 19:
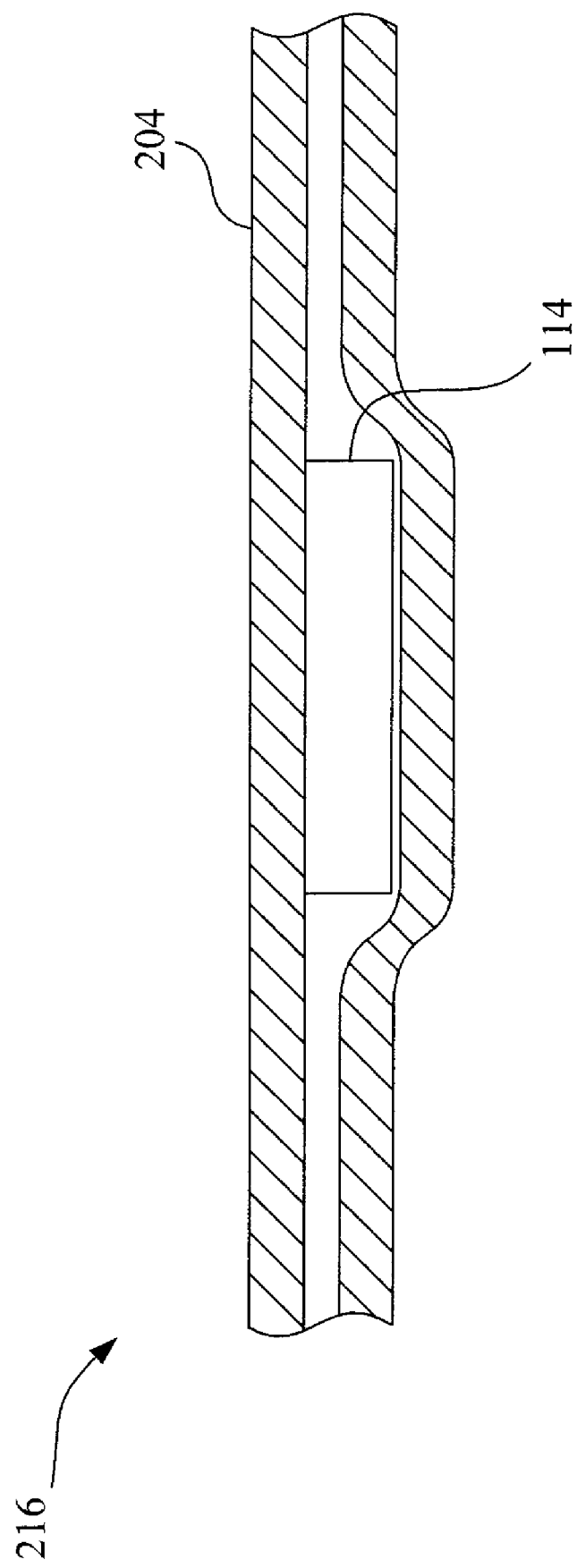
FIG. 19 is partial sectional view of the face wrap of FIGS. 17 and 18 showing a pad causing a protrusion on an inside surface of the flexible band.

Referring now to FIG. 19, there is illustrated a cross-sectional view of face wrap 216 showing a pad 114 connected therein causing a portion of band 204 to protrude to apply additional pressure to portions of animal 120, thereby applying acupressure.

By influencing the sensory receptor's firing in and around the face and head of dog 120 we can influence the Central Nervous System of dog 120. Dog 120 also has an Autonomic Nervous System whose purpose is to maintain all the body's vital functions. This includes the sympathetic nervous system (the energy production and expenditure system). If an animal is highly stressed, the Autonomic Nervous System's sympathetic division sends neural messages to the receptors to lower the amount of sensation required to activate the receptors. This action allows the animal to flee or fight when needed. Unfortunately many animals have had trauma to the Central Nervous System or the nerves and associated structures that communicate with the brain and body (the peripheral nervous system). Animals can also sustain stress, illnesses, pain, all of which lower the threshold of sensation needed to fire the sensory receptors. For example, consider trying to cut the nails of a dog that has been abused, is in chronic pain, or that is a product of sustained stress. Even holding that dog's paw produces an adverse response in the dog. Such responses lead to the dog being fitted with a head halter, which can add stress to the dog, some to the point of frantically attempting to remove it in any possible manner.

In theory, maintained pressure at certain points on animal 120, as supplied by the hands of the handler or therapist, acts to calm the sensory receptors and raise the amount of sensation needed to fire those receptors reporting to the brain. A chronically stressed animal 120 also perceives potential injury when there may be none. Hence animal 120 has its "guard up" so to speak. As a therapeutic Face Wrap/band 216 is applied with the handler or therapist's hands, both act as therapeutic agents to calm the animal. The applied pressur slowly sinks into the tissue and quiets the active firing of those receptors resulting in a calmer dog. The advantage of using therapeutic Face Wrap/band 216 is that animal 120 may struggle at first, thereby expending energy, all the while input is being provided to his nervous system that is even, rhythmic and repetitive, producing a calming of mind and body. Animal 120 quickly settles into a more pliable state and his guard is lowered.

The new and approved animal garment of the invention provides an animal garment with which animals of all kinds may be treated in accordance with the traditional medicinal concepts of acupressure. Treatment of animals by use of the animal garment may help reduce symptoms of stress. Treatment of animals with the animal garment is also useful to enhance the recovery of the animal from injury. The new and improved animal garment may also be used to reduce an animal's reaction to loud noises. The new and improved animal garment may also be used to reduce aggressive or fearful behavior in an animal being treated with the animal garment. Treatment with the animal garment can also be helpful in reducing shock experienced by the animal being treated. Another treatment of animals with the animal garment helps to reduce whelping difficulty. The new and improved animal garment can also be utilized to treat animals in order to reduce fear biting. The new and approved animal garment can be used to reduce the stress of animal training. Treatment with the new and improved animal garment can also be utilized to reduce the anxiety associated with other physical treatments of animals. The new and improved animal garment may also be utilized to reduce all sorts of anxiety behavior in animals. The new and improved animal garment provides all of these features and can be utilized to improve animal behavior and health in all of the above instances.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An animal face wrap, comprising: at least one pad; a single continuing endless flexible band in the form of a figure-8 shaped loop having an inner surface and an unconstrained crossover zone with no fastener with said at least one pad being attached to and extending inwardly from said inner surface apart from said crossover zone, said at least one pad being internal to and connected to said single flexible band, said pad causing said flexible band to protrude;
  at least one constrictor associated with said band, said at least one constrictor being tensionable, said crossover zone adjusting along said single flexible band as said at least one constrictor is tensioned, said at least one constrictor being a string extending between a portion of said flexible band and said at least one pad, at least one piece of said string extending from an other portion of said band; and
  a sliding lock apparatus for adjusting a tension of said string.

2. The animal face wrap of claim 1, wherein said at least one constrictor is a plurality of constrictors, each said constrictor being positioned over known acupressure points of an animal, said constrictors applying a desired amount of pressure to acupressure points of said animal.

3. The animal face wrap of claim 2, wherein said constrictors are adjustable to reduce anxiety behavior in said animal.

4. The animal face wrap of claim 1, wherein said at least one pad is a magnetic pad.

5. The animal face wrap of claim 1, wherein said band has a length and a width, said width varying over said length.

6. The animal face wrap of claim 5, wherein said width at one position along said length of said band is twice said width of at another position along said length of said band.

7. The animal face wrap of claim 1, wherein said band is resiliently expandable.

8. A method of applying an animal face wrap to an animal, comprising the steps of:
  wrapping a portion of a flexible band around a neck of the animal, said flexible band being continuous and endless having an inner surface and an unconstrained crossover zone with no fastener with at least one pad attached to said flexible band within said flexible band causing said flexible band to extend inwardly toward the animal apart from said crossover zone;
  wrapping another portion of said band around a muzzle of the animal;
  positioning at least one constrictor associated with said band relative to a portion of the animal; and
  sliding said flexible band over itself in said crossover zone as said at least one constrictor is positioned in said positioning step, said band being in the form of figure-8 shaped loop, said at least one constrictor being a string extending between a portion of said inner surface of said flexible band and said at least one pad.

9. The method of claim 8, wherein said at least one constrictor is a plurality of constrictors, each said constrictor being positioned over known acupressure points of an animal, said constrictors applying a desired amount of pressure to acupressure points of said animal.

10. The method of claim 9, wherein said constrictors are adjustable to reduce anxiety behavior in said animal.

11. The method of claim 8, wherein said band is substantially flat having an overlapping portion.

12. The method of claim 8, wherein said band has a length and a width, said width varying over said length.

13. The method of claim 8, wherein said band is resiliently expandable.

* * * * *